(12) United States Patent
Zemany

(10) Patent No.: US 8,120,524 B2
(45) Date of Patent: Feb. 21, 2012

(54) MOTION DETECTION SYSTEMS USING CW RADAR IN COMBINATION WITH ADDITIONAL SENSORS

(75) Inventor: Paul D. Zemany, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 823 days.

(21) Appl. No.: 11/919,365

(22) PCT Filed: Oct. 11, 2006

(86) PCT No.: PCT/US2006/040035
§ 371 (c)(1),
(2), (4) Date: Oct. 26, 2007

(87) PCT Pub. No.: WO2007/047419
PCT Pub. Date: Apr. 26, 2007

(65) Prior Publication Data
US 2009/0303100 A1 Dec. 10, 2009

Related U.S. Application Data
(60) Provisional application No. 60/726,960, filed on Oct. 14, 2005.

(51) Int. Cl.
G01S 7/35 (2006.01)
G01S 13/00 (2006.01)

(52) U.S. Cl. ............ 342/28; 342/27; 342/52; 342/53; 342/54; 342/55; 342/118; 342/128; 342/175; 342/195

(58) Field of Classification Search ............ 342/27, 342/28, 52–55, 58–60, 82, 89–103, 175, 342/195, 13, 42, 118, 124, 61, 68, 128–133; 250/493.1; 340/500, 540, 541, 552, 554, 340/901, 905; 102/200, 206, 211, 214
See application file for complete search history.

(56) References Cited

U.S. PATENT DOCUMENTS

| | | | |
|---|---|---|---|
| 3,152,547 A * | 10/1964 | Kyle | 102/214 |
| 3,727,216 A | 4/1973 | Antonio | |
| 3,801,978 A | 4/1974 | Gershberg et al. | |
| 3,846,778 A | 11/1974 | Galvin et al. | |
| 3,902,172 A * | 8/1975 | Weiss et al. | 102/214 |
| 4,243,979 A | 1/1981 | Kleinschmidt | |

(Continued)

OTHER PUBLICATIONS

W. S. Hinman et al., "Radio Proximity-Fuze Development"; Proceedings of the I.R.E. and Waves and Electrons; vol. 34, No. 12; Dec. 1946; pp. 976-986; ISSN: 0096-8390; Digital Object Identifier: 10.1109/JRPROC.1946.233235.*

*Primary Examiner* — Bernarr Gregory
(74) *Attorney, Agent, or Firm* — Daniel J. Long; Robert K. Tendler

(57) ABSTRACT

Whether or not the CW radar is utilized for through-the-wall detection, additional one or more sensors are used with the CW radar to confirm the motion detection result or to in fact turn on the CW radar once motion or the physical presence of an individual has been sensed, thereby to provide confirmation of a less-reliable sensor with the use of the more reliable CW radar. Thus, the addition of other sensors provides lower power consumption, lower false alarm rates and better discrimination and classification of moving objects.

8 Claims, 2 Drawing Sheets

U.S. PATENT DOCUMENTS

| | | | |
|---|---|---|---|
| 4,275,390 A | 6/1981 | Heywang et al. | |
| 5,012,113 A * | 4/1991 | Valentine et al. | 250/493.1 |
| 5,122,802 A * | 6/1992 | Marin | 342/13 |
| 5,579,009 A | 11/1996 | Nilsson-Almqvist et al. | |
| 5,621,412 A * | 4/1997 | Sharpe et al. | 342/42 |
| 6,014,100 A * | 1/2000 | Fehrenbach et al. | 342/124 |
| 6,061,014 A | 5/2000 | Rautanen et al. | |
| 6,069,561 A * | 5/2000 | Schopf et al. | 342/28 |
| 6,417,797 B1 | 7/2002 | Cousins et al. | |
| 6,646,590 B2 * | 11/2003 | Terashima et al. | 340/905 |
| 6,650,278 B2 * | 11/2003 | Terashima et al. | 342/82 |
| 6,670,909 B2 | 12/2003 | Kim | |
| 6,850,183 B2 | 2/2005 | Reeves et al. | |
| 6,903,677 B2 | 6/2005 | Takashima et al. | |
| 6,906,659 B1 | 6/2005 | Ramstack | |
| 6,909,397 B1 * | 6/2005 | Greneker, III et al. | 342/28 |
| 7,046,187 B2 * | 5/2006 | Fullerton et al. | 342/54 |
| 7,142,150 B2 * | 11/2006 | Thackray | 342/54 |
| 7,310,060 B2 * | 12/2007 | Stilwell et al. | 342/52 |
| 2002/0080060 A1 * | 6/2002 | Terashima et al. | 342/54 |
| 2002/0097179 A1 * | 7/2002 | Terashima et al. | 342/54 |

* cited by examiner

MOTION DETECTION SYSTEMS USING CW RADAR IN COMBINATION WITH ADDITIONAL SENSORS

RELATED APPLICATIONS

This Application claims rights under 35 USC §119(e) from U.S. Application Ser. No. 60/726,960 filed Oct. 14, 2005, the contents of which are incorporated herein by reference. This Application is related to U.S. Pat. No. 7,460,053 by Paul D. Zemany, Jr. of Amherst, N.H., entitled "Method and Apparatus for Through-the-Wall Motion Detection Utilizing CW Radar;" and U.S. Pat. No. 7,633,426 by Eldon M. Sutphin of Merrimack, N.H., entitled "Combined Radar and Communications Link." The contents of these two applications are incorporated herein by reference.

FIELD OF THE INVENTION

This invention relates to the use of CW radar in combination with one or more additional sensors for detecting the motion of objects, animals or people.

BACKGROUND OF THE INVENTION

It is often desirable to detect moving objects, animals or individuals, for instance, in a security system in a building. Sensors in these security systems have typically used infrared or ultrasound energy to detect motion. It is well known that such sensors often have coverage limitations that make it difficult to insure reliable detection or may have false alarm rates that are unacceptable.

As described in the referenced patent application "Method and Apparatus for Through-the-Wall Motion Detection Utilizing CW Radar," the use of CW radar enables motion detection through walls and other obstacles and is therefore less susceptible to the limitations of infrared and ultrasonic motion sensors.

Furthermore, it may be useful to have a sensor that communicates with a central station without using wires as disclosed in the referenced patent application "Combined Radar and Communications Link."

CW radar sensors by themselves, however, may have their own limitations such as relatively high power drain and a relatively high false alarm rate.

What is therefore required is a low cost, ultra-low power drain, wireless, compact remotely operated unit that can detect motion of objects, animals or individuals with a reduced false alarm rate.

More particularly, one can utilize a CW radar to sense movement behind a wall or in fact movement anywhere. When these CW movement detection radars are utilized and are battery-powered, they draw a considerable amount of current. Thus CW radar is not useful for long-term surveillance applications. For instance, such CW radar surveillance units, when utilizing a couple of double-A batteries, might last 12 hours before the batteries run out.

Moreover, due to the relatively sensitive nature of the phase detection used in detecting motion for these CW radars, one would like to have an independent confirmation that motion is occurring so as to minimize the high false alarm rates associated with some CW radars.

Thus, at the very least there is a requirement to be able to provide long-term surveillance utilizing a battery-powered CW radar and to eliminate some of the problems due to false alarming.

Moreover, if numbers of CW radar sensors are used to track a moving object, the combined power drain would not be compatible with long-term surveillance applications.

Additionally, while movement can be determined by the use of CW radars, there may need to be classification of the type of moving target detected.

SUMMARY OF INVENTION

In order to solve the power consumption dilemma when using CW radars and to reduce false alarm rates, in the subject invention one or more additional sensors are coupled to a CW radar motion detection system. The additional sensors may be of a low-powered variety that can wake up a higher-power sensor such as the CW radar, thus saving battery energy. Moreover, simultaneous detections by both the CW radar motion detection system and the additional sensor can reduce false alarms. As a further advantage, the use of multiple sensors results in the ability at one location to cue a nearby unit to track a moving object. Also, if more than one sensor is used, one unit can cue nearby units to verify the detection for false alarm rate reduction. Even further, the use of different types of sensors can provide a discrimination capability for classifying the moving object. In addition, one can use dual analog and digital communication in which one communicates motion detection digitally and provides a listening device at the surveilled scene. This allows a human operator to listen to the movement pattern of the object to verify the presence of a moving object. One or more of the following sensors may be added to the motion detection radar system: seismic sensors, magnetic sensors, E-field sensors, infrared sensors, video-band sensors, chemical sensors, acoustic sensors and/or ultrasonic sensors.

If the additional sensor is utilized to turn on the CW radar, thus saving battery life, then one could for instance turn on the radar using a seismic sensor when seismic activity is sensed. The seismic activity can be behind-the-wall activity where something is moving or causing vibration within a building, or a seismic sensor may be used in the field to detect, for instance, the presence of a vehicle or the footsteps of an individual. Once the presence of a vehicle or individual is sensed with these high false alarm rate sensors, the CW radar motion detection system can be turned on to verify the presence of the object of interest.

In a military or police operation, it is oftentimes the case that one wants to monitor a building after it had been cleared to check and see whether the activity has started up again. In such operations, oftentimes a building is cleared, sometimes by utilizing a hand-held through-the-wall radar detection system. Once the building has been certified as being cleared, the authorities wish to know whether the individuals have returned.

In the subject application, one would set up radars around the building or in one room and look through to another room in order to detect any new motion or activity. However, monitoring for the re-emergence of individuals within a building involves a long-term surveillance project. Thus, it would be useful if low current-drain sensors could be used to turn on the CW radars so as to be able to effectively check for individuals in a previously cleared building.

The additional sensors described herein can be seismic sensors, which can run on exceedingly small amounts of power, for instance that associated with a watch battery. Seismic sensors, however, have a high false alarm rate and this is especially true with long-range remote seismic sensors that run for a long period of time. As a result, such passive sensors are prone to false alarms.

It is thus important to address the false alarm rate for the passive sensors and to have a sensor system that would first come on and activate a CW radar, with the CW radar being a crosscheck against false alarms of the passive sensor.

While there are a multitude of sensors that could be utilized in combination with the CW radar, in one instance it is advantageous to couple a CW radar with a video camera. In one scenario, the radar is aimed at a doorway such that if there is any motion or activity at the doorway, a video camera aimed at the doorway would be activated to verify if someone is coming in or out of the door. Note that the output of the CW radar can cue an operator to look at the output of the video sensor to ascertain the presence of an individual.

One can also have a robust system in which a CW radar looks out through a doorway that is closed, coupling the CW radar motion sensor with the output of a video camera aimed at the doorway. When the CW radar detects motion, the video camera i. turned on to detect someone who could be coming through the door shortly. Thus, the CW radar can be used to detect people on the other side of a door or a wall, after which a video camera can be turned on. The detection of motion by the CW radar enables cuing the person doing the monitoring to monitor the video signal. In this way, one can robustly know whether a person has come through the door.

It is, of course, possible to combine the CW radar motion detector with a magnetic sensor, for example, so that one can detect a person carrying a ferrous metal weapon or other ordnance. Thus the subject system can differentiate between people who are armed and people who are unarmed. If one detects an output both from the magnetic sensor and the radar, one knows that a person in the vicinity is armed. Utilizing a CW radar alone, there would be uncertainty as to whether a person picked up by the radar is carrying a weapon.

Noting that all sensors can be spoofed or false-alarmed on different things, the CW radar can, when used in conjunction with another sensor offer an improvement in detection. This would be useful with passive IR sensors that can be triggered by, for instance, the sun going in and out or clouds going by. A CW radar sensor would not necessarily suffer from the same problem.

On the other hand, if the CW radar is used out of doors, moving leaves can approximate a moving individual. This constitutes a significant cause of false alarms. The benefit of having multiple sensors is to be able to ascertain whether or not a detected event is a false alarm. If the system requires two sensors to obtain an alarm condition, one can greatly reduce the overall false alarm rate.

It is also noted that seismic sensors and passive IR sensors are extremely low power. Thus, while higher-power sensors can be utilized in combination with a CW radar, one would choose to use sensors whose longevity is not compromised by current drain.

Moreover, the CW radar may be complemented with acoustic sensors such as microphones. These sensors are exceedingly low power. Thus, the acoustic sensors can be used to cue the CW radar. On the other hand, if the CW radar picks up motion, microphones in the area can oftentimes permit the operator to distinguish whether the motions are from people of interest or from artifacts that can be ignored.

There is another class of sensors called E-field sensors that can be used in combination with CW radars. It has been shown that these E-field sensors can sense the motion of individuals because moving individuals disturb the local E-field. Moreover, it has been found that these E-field sensors are sensitive enough to sense a person's footsteps. It is noted that E-field sensors are very, very low-power sensors and it is through the use of the E-field sensor that one could turn on a CW radar to verify the E-field sensor event.

It is noted that while microwave motion sensors may be utilized to detect motion, they operate at exceedingly high frequencies and are not beneficial for through-the-wall motion detection. On the other hand, the subject CW radar is exceedingly good at detecting motion behind walls.

While standard motion detectors are utilized at relatively short ranges, it will be appreciated that CW radars can operate at much longer distances and through walls. For instance, if one had a house that one wished to protect, one could place a CW radar sensor at one end of the house and be able to detect motion throughout the entire house. This would be true whether or not there are multiple walls between the individual reflecting the CW radar signal and the CW radar. Thus, the CW radar can be utilized as an effective intruder detector.

When backed up with a second sensor, then whatever is detected as motion by the CW radar could be confirmed by the additional sensor. Moreover, one could use an omnidirectional CW radar antenna and put the radar at the center of the house for more complete and robust motion detection.

To make the CW radar motion detection robust, one could the utilize E-field sensors about the protected area or even seismic sensors around the perimeter, at the doorways or windows to confirm what the CW radar reports as being motion. This system would have an exceptionally low false alarm rate and depending on the placement of the additional sensors, one could, for instance, detect the difference between motion of an individual and motion of, for instance, animals such as birds that could fly in through an open window.

In short, the subject invention combines the CW radar motion detection system with another or different type of sensor to give an independent assessment of what is going on in the surveilled area. Thus, for security and intrusion detection, coupling a CW radar with another sensor vastly improves the false alarm rate of the overall system. Additionally, because CW radars are relatively small and portable, mounting a CW radar on a robot and having the robot drive up to a building to detect motion in the building can be supplemented by other sensors at the building, such as described above. Moreover, if multiple CW radar motion detectors are used, the CW radar detectors can be triggered by the additional sensors so as to minimize battery drain during a prolonged surveillance operation. Such a prolonged surveillance operation could, for instance, involve surveilling a house where search warrants are not available, noting that search warrants are not required for outside surveillance. Thus, rather than deploying a police detail to stake out a building, one can use one or more CW radar motion detector systems along with additional sensors to activate the radars and carry out the mission over days and weeks.

Additionally, the CW radar can verity that what other sensors detect is a target of interest. Since the radar provides information about the target such as the motion of the target, the radar can also provide range rate if, for instance, a dual frequency CW radar is used. Such a radar is described in PCT Patent Application No. US2004/036446, filed Nov. 2, 2004, assigned to the assignee hereof and incorporated herein by reference. Moreover, if multiple radars are used, for instance for triangulation purposes, if they are used in conjunction with other sensors, they can cue each other in an intelligent fashion such that the combined data can be used to track an individual or target.

If low-power sensors used to cue a radar are located in the same physical package, then the low-power sensor can turn on its associated CW radar. Note that the sensors associated with the package can cue sensors at other locations by virtue of communications protocols, including modulating the CW radar output.

Again, data from all sensors can be fused to track targets and provide a basis for deciding to cue other sensors.

In summary, whether or not the CW radar is utilized for through-the-wall detection, an additional one or more sensors are used with the CW radar to confirm the motion detection result or to turn on the CW radar once motion or the physical presence of an individual has been sensed, thereby to provide confirmation of events sensed by a less-reliable sensor with the use of CW radar. Thus, the addition of other sensors provides lower power consumption, lower false alarm rates and better discrimination and classification of moving objects.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
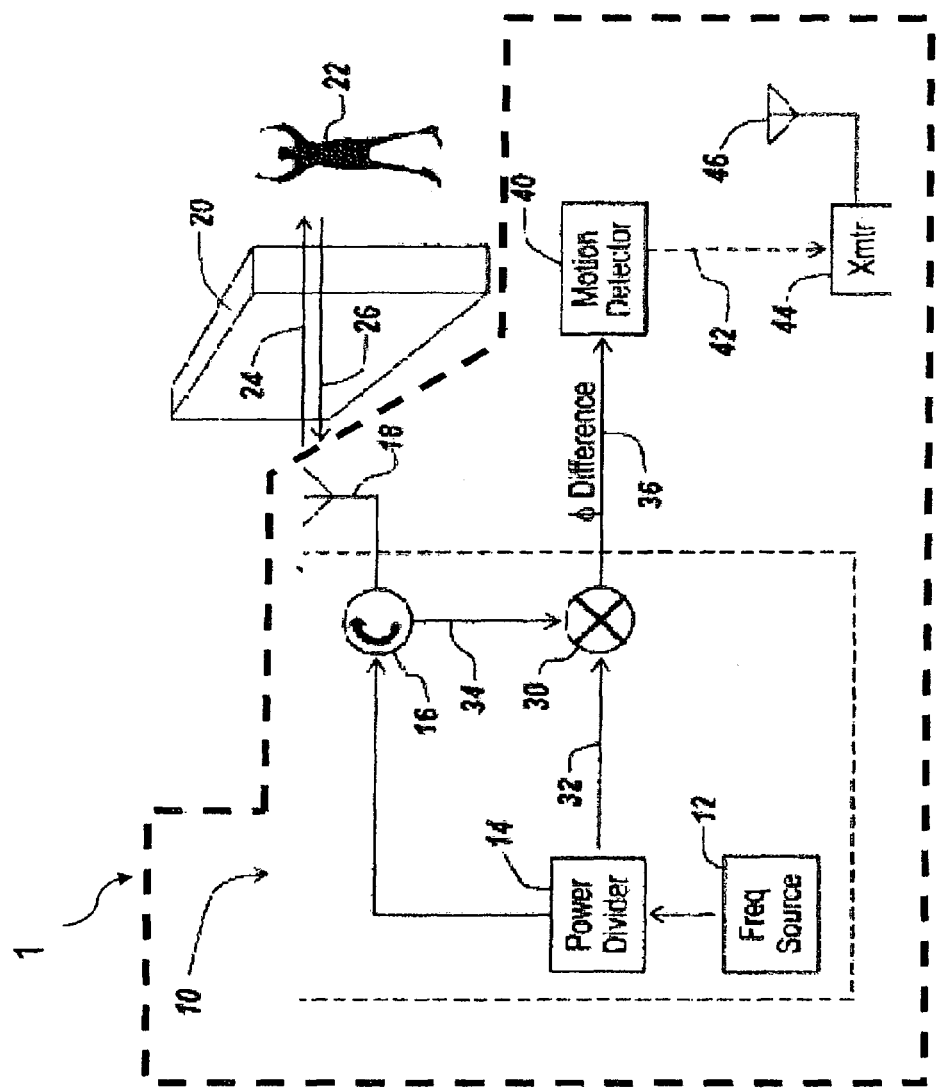
FIG. 1 is a diagrammatic illustration of a prior art single-frequency CW radar system; and, FIG. 2 is a diagrammatic illustration of the utilization of a CW radar system in combination with another sensor to provide a number of advantages, including keying the CW radar upon tripping of the other sensor for lower power consumption, the lowering of false alarms due to outputs from one or more of the sensors, and to assist in better discrimination and classification of moving objects.

Referring now to FIG. 1, prior art motion detector 1 of the referenced application includes a CW radar 10 consisting of frequency source 12, power divider 14 circulator 16, antenna 18 and mixer 30.

In one embodiment, antenna 18 is a directional antenna such as a YAGI or flat panel, so as to project a majority of the radar energy in a given direction, to ascertain the presence of a moving object within that beam. In another embodiment, the antenna is omni-directional, so that any moving object that comes into the vicinity is detected.

In one embodiment, radar 10 is a single frequency radar with frequency source 12 set optimally to 900 MHZ.

As illustrated, one output of power divider 14 is coupled to circulator 16, which is coupled to antenna 18. The antenna forms CW beam 24, which penetrates wall 20. Signal 26, reflected from moving object 22 behind the wall, is received by antenna 18 and sent to circulator 16. Circulator 16 passes reflected signal 26 to mixer 30 as signal 34.

Power divider 14 divides the power of frequency source 12 to provide a phase reference signal 32 to mixer 30. The mixer combines signals 32 and 34 to derive a phase difference signal 36 to motion detector 40. Phase difference signal 36 is also commonly known as the Doppler signal, signifying motion of object 22 with respect to radar 10.

It is the function of motion detector 40 to ascertain when a change in phase difference signal 36 exceeds a predetermined threshold. When this occurs, a moving object behind wall 20 is indicated. Motion detector 40 may have a local alarm or display screen.

In an alternate embodiment, as indicated by dotted line 42, the output of motion detector 40 may be sent to transmitter 44 and by antenna 46 to a remote location.

In another embodiment, as disclosed in the referenced patent application entitled "Combined Radar and Communications Link," the same CW radar is used to also send the detection report to a remote location.

Figure 2:
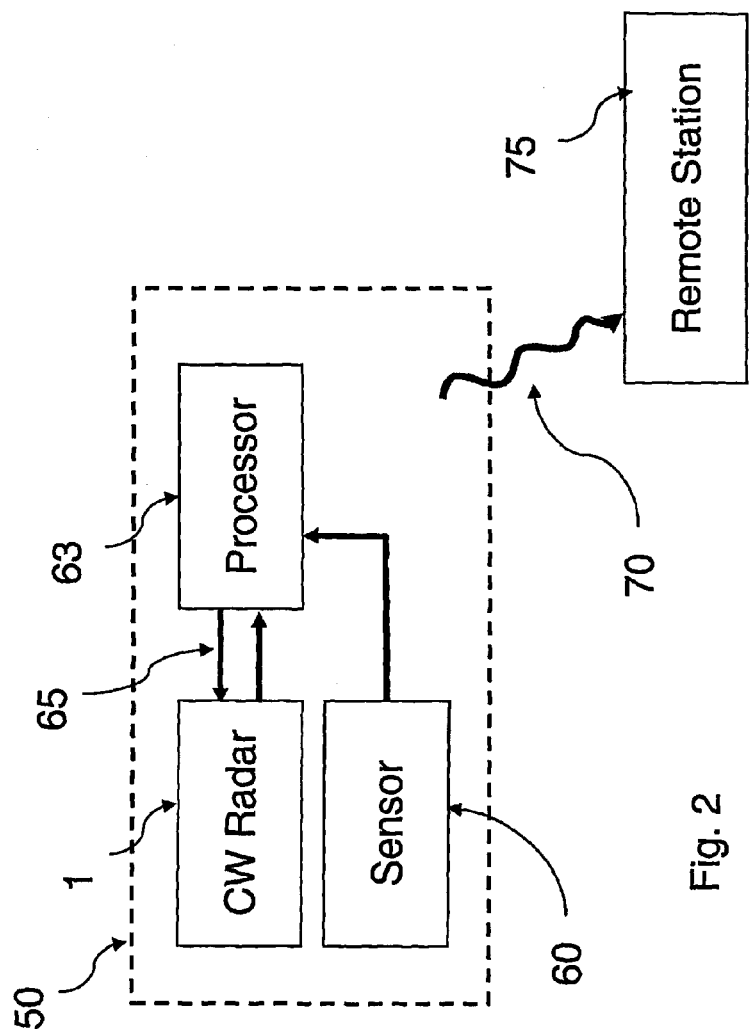

FIG. 2 illustrates the motion detection system 50 of the invention, which includes a CW radar system 1, a sensor 60 and a processor 63. Sensor 60 may be seismic, magnetic, E-field, infrared, chemical, acoustic, ultrasonic or video. This list is intended to be illustrative and other types of sensors may be included without changing the substance of the invention. In addition, more than one of these sensors may be included.

Processor 63 may be a simple microcontroller, a digital signal processor (DSP) or a more powerful computer such as a PC.

In one embodiment, processor 63 receives a signal from sensor 60 and determines it is indicative of a moving object. The processor then turns on the electrical power to CW radar system 1 via control line 65. If the processor determines that signals from both sensor 60 and radar 1 indicate a moving object, signal 70, which may be characterized as an alarm signal, is generated. In one embodiment this signal is sent to remote station 75 to alert an operator.

In another embodiment, microcontroller 63 uses information from both sensor 60 and radar 1 to discriminate between types of moving objects. For example, if sensor 60 is a seismic sensor, the frequency and pattern of the vibrations may be used to distinguish between a moving person and a moving vehicle such as a tank, whereas radar 1 may be used to determine the direction or speed of movement.

Microcontroller 63 may also be used to modulate the CW radar beam as described in the referenced application entitled "Combined Radar and Communications Link" for simplified communication to remote station 75.

What has therefore been provided is an extremely simple CW radar with additional sensor or sensors for detecting the a moving object and to communicate to a remote station.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In a long-term surveillance operation, apparatus for robustly sensing motion of an object, comprising:
    a CW radar for motion detection having an output indicative of detected motion; and,
    a sensor for sensing activity in the vicinity of said CW radar and for providing an output responsive to sensed activity, said sensor having a low power drain associated therewith;
    a unit for both turning on the CW radar responsive to sensed activity and for indicating the presence of a moving object upon outputs from said CW radar and said sensor; and,
    a processor for turning on said CW radar upon an output from said low-power sensor, whereby current draw associated with said CW radar is limited to times when there is an output from said sensor, thus to permit prolonged surveillance.

2. A method for increasing the robustness of a CW radar motion detection system, comprising the steps of:
    providing a number of CW radars and a processor for processing target range rate and outputting range to a radar target;

providing a sensor having an output;

turning on the radars responsive to an output from the sensor; and, generating an alarm signal upon the generation of outputs from the radar and the sensor.

3. The method of claim 2, wherein said sensor is taken from the group consisting of seismic sensors, magnetic sensors, E-field sensors, infrared sensors, video sensors, chemical sensors, acoustic sensors, and ultrasonic sensors.

4. The method of claim 2, wherein said CW radar includes a dual frequency CW range-determining radar.

5. In a motion detection system, a method for tracking a radar target, comprising the steps of:

utilizing multiple CW radars each to separately track the radar target and at least one sensor for tracking a target;

using the output of the sensor to turn on selected radars to track the target; and, combining the data from the radars to track the target.

6. The method of claim 5, wherein the sensor is taken from the group consisting of seismic sensors, magnetic sensors, E-field sensors, infrared sensors, video sensors, chemical sensors, acoustic sensors, and ultrasonic sensors.

7. In a surveillance system in which a building has been cleared of individuals, a method for ascertaining re-entry of an individual into the building, comprising the steps of:

utilizing a CW motion-sensing radar to illuminate the building with the signal from the CW radar;

sensing a parameter indicative of the presence of an individual in the building;

turning on the CW radar based on the sensor detecting the parameter indicative of the detection of an individual; and, determining that an individual is in the cleared building by a response from both the CW radar and the sensor.

8. The system of claim 7, wherein said sensor is taken from the group consisting of seismic sensors, magnetic sensors, E-field sensors, infrared sensors, video sensors, chemical sensors, acoustic sensors, and ultrasonic sensors.

* * * * *